J. H. PIERSON.
MAKING WOOD SCREWS.

Patented Nov. 28, 1836.

UNITED STATES PATENT OFFICE.

JEREMIAH H. PIERSON, OF RAMAPO, NEW YORK.

MACHINE FOR NICKING OR CUTTING NOTCHES IN HEADS OF WOOD-SCREWS.

Specification foming part of Letters Patent No. 92, dated November 28, 1836; Reissued March 8, 1848.

*To all whom it may concern:*

Be it known that I, JEREMIAH H. PIERSON, of Ramapo, in the county of Rockland and State of New York, have invented a new and useful Machine for Nicking or Cutting the Notches in the Heads of Wood-Screws; and I do hereby declare that the following is a full and exact description thereof, reference being had to the accompanying drawings.

Figure 1:
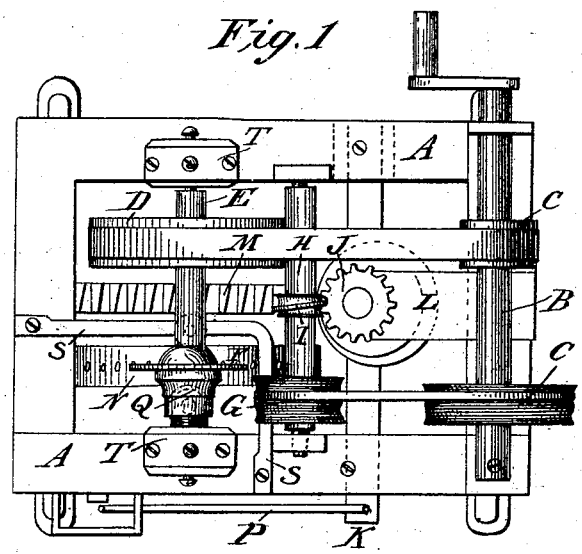
Figure 2:
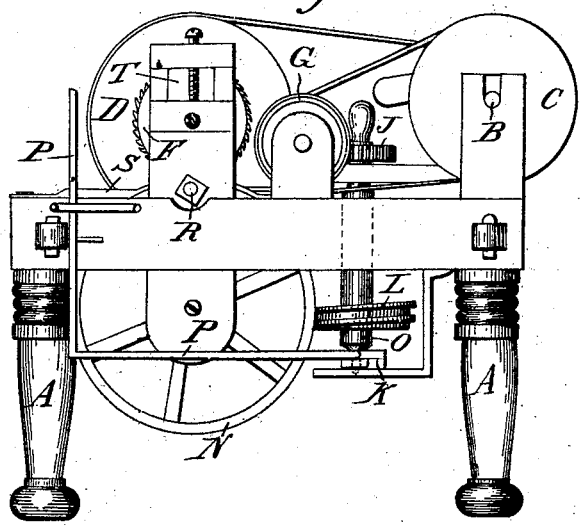

Figure 1, is a plan, or top view, of the machine, and Fig. 2, an elevation on one side, these two views showing all the essential parts of the machine, and the corresponding parts of each being designated by similar letters of reference.

A, A, is the frame work of the machine.

B, is a shaft to which the drawing power is applied, upon which there are two pulleys C, C, with bands for driving the different parts of the machinery.

D, is a whirl on the shaft E, which carries the circular cutter, F, by which the screws are to be nicked. A band from the whirl C, drives the whirl G, on the shaft H, upon which there is an endless screw, or worm I, which takes into a pinion J, upon the end of a vertical shaft, the lower end of which runs in a bridge tree, or shifting bar, the end of which is shown at K, Fig. 2, this shaft carries an endless screw, or worm L, which takes into, and drives the toothed wheel, M, Fig. 1; which toothed wheel is on the same shaft with that of N, for holding blanks; the lower end O, of the vertical shaft being seen in Fig. 2. The connecting rod, P, acting upon the bridge tree or shifting bar, K, the blank wheel N, is in two parts, divided through its plane, as shown by the line along its periphery; one of these parts is fixed firmly on its axle, while the other part slides upon a square eye, or otherwise, upon the axle, and is capable therefore of receding from the fixed part, although it revolves with it. The periphery of this wheel is perforated with holes at the junction of its two parts as shown in the drawing, which holes are of such size as to receive, and hold the blanks which are to be nicked. To cause the two portions of this wheel to grip the blank while it is being nicked; there is a friction roller which bears against the outer edge of the periphery of the movable post, immediately under the circular cutter, the dotted line G, Fig. 1, marks its situation, which is opposite to the screw nut R, Fig. 2, which confines the friction wheel box in its place. To react against this friction roller, a similar one is placed opposite to it, and bears upon the fixed portion of the blank wheel; the bar S, is to sustain this friction wheel. The shaft which carries the saw is raised, or lowered by means of the adjusting screws T, T, and by this means the depth of the nick is perfectly regulated.

Having thus fully described the construction of my said machine, its operation will be readily understood. The shaft B, being made to revolve by any motive power, the blanks are dropped into the holes in the blank wheels as it approaches the cutter, and are held firmly while being cut by the pressure of the friction rollers; and being released from this pressure, they fall out by their own gravity, as they are carried around to the lower part of the machine.

I have not thought it necessary to designate any particular admeasurements, or proportions of the respective parts, as these will differ, materially, according to the sizes of the screws to be nicked, and can be readily judged by any competent workman.

What I claim as my invention, is—

.The general combination and arrangement of the respective parts of the before described machine, in which the blanks to be nicked are held in a blank wheel, operated upon by friction rollers; and made to revolve through the intermedium of endless screws, and toothed wheels substantially in the manner described, while the nicking is effected by means of a revolving cutter. I do not intend to claim either of the individual parts in its separate character, but only as above described, the combined operation of these parts so as to produce the intended effects, in the way set forth.

JERH. H. PIERSON.

Witnesses:
ANTHONY HOUSTON,
JAMES H. KESS.

[FIRST PRINTED 1914.]